United States Patent
Choe et al.

(10) Patent No.: US 7,662,492 B2
(45) Date of Patent: Feb. 16, 2010

(54) PERPENDICULAR MAGNETIC RECORDING MEDIUM HAVING A MULTI-LAYER INTERLAYER THAT INCLUDES BCC MATERIAL

(75) Inventors: Gunn Choe, San Jose, CA (US); Kai Tang, San Jose, CA (US)

(73) Assignee: Hitachi Global Storage Techologies Netherlands, B.V., Amsterdam (NL)

(*) Notice: Subject to any disclaimer, the term of this patent is extended or adjusted under 35 U.S.C. 154(b) by 272 days.

(21) Appl. No.: 11/736,428

(22) Filed: Apr. 17, 2007

(65) Prior Publication Data

US 2008/0213630 A1    Sep. 4, 2008

Related U.S. Application Data

(63) Continuation-in-part of application No. 11/681,693, filed on Mar. 2, 2007.

(51) Int. Cl.
    G11B 5/66    (2006.01)
(52) U.S. Cl. .................................. 428/831.2
(58) Field of Classification Search ........ None
    See application file for complete search history.

(56) References Cited

U.S. PATENT DOCUMENTS

| | | | |
|---|---|---|---|
| 6,562,489 B2* | 5/2003 | Abarra et al. ........... | 428/831 |
| 6,572,989 B2 | 6/2003 | Bian et al. | |
| 6,884,520 B2* | 4/2005 | Oikawa et al. .......... | 428/836.2 |
| 6,994,924 B2 | 2/2006 | Oikawa et al. | |
| 7,138,194 B2 | 11/2006 | Shimizu et al. | |
| 7,393,601 B1* | 7/2008 | Chen et al. ............. | 428/828 |
| 2002/0058160 A1 | 5/2002 | Oikawa et al. | |
| 2004/0072027 A1 | 4/2004 | Lu et al. | |
| 2004/0106010 A1 | 6/2004 | Iwasaki et al. | |
| 2005/0142388 A1 | 6/2005 | Hirayama et al. | |
| 2005/0202286 A1 | 9/2005 | Chen et al. | |
| 2006/0141292 A1 | 6/2006 | Iwasaki et al. | |
| 2006/0275629 A1 | 12/2006 | Ikeda et al. | |
| 2007/0153419 A1* | 7/2007 | Arai et al. .................... | 360/131 |

FOREIGN PATENT DOCUMENTS

| | | |
|---|---|---|
| JP | 61113122 | 5/1986 |
| JP | 2001167423 | 6/2001 |
| JP | 2002100030 | 4/2002 |
| JP | 2004220737 | 8/2004 |
| JP | 2006099951 | 4/2006 |

OTHER PUBLICATIONS

Matsunuma, Satoshi, et al., "Very High-Density and Low-Cost Perpendicular Magnetic Recording Media Including New Layer-Structure "U-Mag"", IEEE Transactions on Magnetics, vol. 41, No. 2, pp. 572-576 (Feb. 2005).

* cited by examiner

Primary Examiner—Holly Rickman
(74) Attorney, Agent, or Firm—Duft Bornsen & Fishman, LLP

(57) ABSTRACT

Perpendicular magnetic recording media and methods of fabricating perpendicular magnetic recording media are described. The perpendicular magnetic recording medium of one embodiment includes a soft magnetic underlayer (SUL), an interlayer, and a perpendicular magnetic recording layer. The interlayer comprises a layer formed from a first material (e.g., NiWCr) having a face-centered-cubic (FCC) structure, a layer formed from a second material (e.g., Cr) having a body-centered-cubic (BCC) structure, and a layer formed from a third material (e.g., Ru) having a hexagonal-close-packed (HCP) structure.

18 Claims, 4 Drawing Sheets

PERPENDICULAR MAGNETIC RECORDING MEDIUM HAVING A MULTI-LAYER INTERLAYER THAT INCLUDES BCC MATERIAL

RELATED APPLICATIONS

This patent application is a continuation-in-part of a co-pending patent application having the Ser. No. 11/681,693, which was filed on Mar. 2, 2007, and is incorporated by reference as if fully provided herein.

BACKGROUND OF THE INVENTION

1. Field of the Invention

The invention is related to the field of magnetic disk drive systems and, in particular, to a perpendicular magnetic recording medium having an interlayer formed from multiple layers. More particularly, the interlayer is formed from a layer of FCC material (e.g., NiWCr), a layer of BCC material (e.g., Cr), and a layer of HCP material (e.g., Ru).

2. Statement of the Problem

One type of recording medium presently used in magnetic recording/reproducing apparatuses is a longitudinal magnetic recording medium. A longitudinal magnetic recording medium includes a magnetic recording layer having an easy axis of magnetization parallel to the substrate. The easy axis of magnetization is the crystalline axis that is aligned along the lowest energy direction for the magnetic moment. Another type of recording medium is a perpendicular magnetic recording medium. A perpendicular magnetic recording medium includes a magnetic recording layer having an easy axis of magnetization oriented substantially perpendicular to the substrate. Hexagonal-close-packed (HCP) Co-alloys are typically used as the magnetic recording layer for both longitudinal and perpendicular recording. The easy axis of magnetization for these materials lies along the c-axis or <0001> direction.

The perpendicular magnetic recording medium is generally formed with the following layers on a substrate, a soft magnetic underlayer (SUL), an interlayer, a perpendicular magnetic recording layer, and a protective layer for protecting the surface of the perpendicular magnetic recording layer. The soft magnetic underlayer (SUL) serves to concentrate a magnetic flux emitted from a main pole of a write head and to serve as a flux return path back to a return pole of the write head during recording on the magnetic recording layer. The interlayer serves to control the size of magnetic crystal grains and the orientation of the magnetic crystal grains in the magnetic recording layer. The interlayer also serves to magnetically de-couple the SUL and the magnetic recording layer.

The interlayer may be formed from a single layer of material, such as a layer of Ru that has an HCP structure. The interlayer may alternatively be formed from multiple layers. For example, a common interlayer comprises a layer of Ru formed on a seed layer, such as Ta, NiFe, NiW, etc. The seed layer is commonly formed from a face-centered-cubic (FCC) material with the layer of Ru (having the HCP structure) formed on the FCC material. One particular interlayer comprises a seed layer of NiW or another Ni-based alloy, a first layer of Ru deposited at a lower pressure, and a second layer of Ru deposited at a higher pressure.

One problem with many present interlayers for perpendicular magnetic recording media is that they include significant amounts of Ru, which is an HCP material. The thickness of Ru in a common interlayer can reach 200 Å or more. As the cost of Ru and other HCP materials increases, the cost of fabricating perpendicular magnetic recording media unfortunately also increases.

SUMMARY OF THE SOLUTION

Embodiments of the invention solve the above and other related problems with an interlayer of a perpendicular magnetic recording medium that includes less Ru (or other HCP material) than present interlayers. The interlayer as provided herein is formed from multiple layers including a layer formed from a face-centered-cubic (FCC) material (e.g., NiWCr), a layer formed from a body-centered-cubic (BCC) material (e.g., Cr), and a layer formed from a hexagonal-close-packed (HCP) material (e.g., Ru). The BCC material advantageously replaces some of the HCP material in the interlayer without affecting performance. Because the BCC material has a lower cost than the HCP material, such as Ru, perpendicular magnetic recording media may be fabricated at a lower cost without degrading performance. The addition of some BCC materials, such as Cr, may also help with corrosion resistance in the media.

One embodiment comprises an interlayer of perpendicular magnetic recording media. The interlayer includes a first layer formed from a first material having a FCC structure. The interlayer also includes a second layer formed from a second material having a BCC structure. The interlayer also includes a third layer formed from a third material having a HCP structure. The BCC material in the interlayer replaces some of the HCP material without degrading performance. At the same time, the BCC material, such as Cr, is less expensive than an HCP material, such as Ru, which allows for more cost effective fabrication of perpendicular magnetic recording media.

In another embodiment, a perpendicular magnetic recording medium includes, among other layers, a soft magnetic underlayer (SUL), an interlayer, and a perpendicular magnetic recording layer. The interlayer includes a FCC layer, a BCC layer, and a HCP layer. In one particular example of the interlayer, the FCC layer is formed from a Ni-based material (e.g., NiWCr), the BCC layer is formed from a Cr-based material (e.g., Cr), and the HCP layer is formed from a Ru-based material (e.g., Ru).

The invention may include other exemplary embodiments described below, such as associated methods of fabricating perpendicular magnetic recording media.

DESCRIPTION OF THE DRAWINGS

The same reference number represents the same element or same type of element on all drawings.

DETAILED DESCRIPTION OF THE INVENTION

FIGS. 1-8 and the following description depict specific exemplary embodiments of the invention to teach those skilled in the art how to make and use the invention. For the purpose of teaching inventive principles, some conventional aspects of the invention have been simplified or omitted. Those skilled in the art will appreciate variations from these embodiments that fall within the scope of the invention. Those skilled in the art will appreciate that the features described below can be combined in various ways to form multiple variations of the invention. As a result, the invention is not limited to the specific embodiments described below, but only by the claims and their equivalents.

Figure 1:
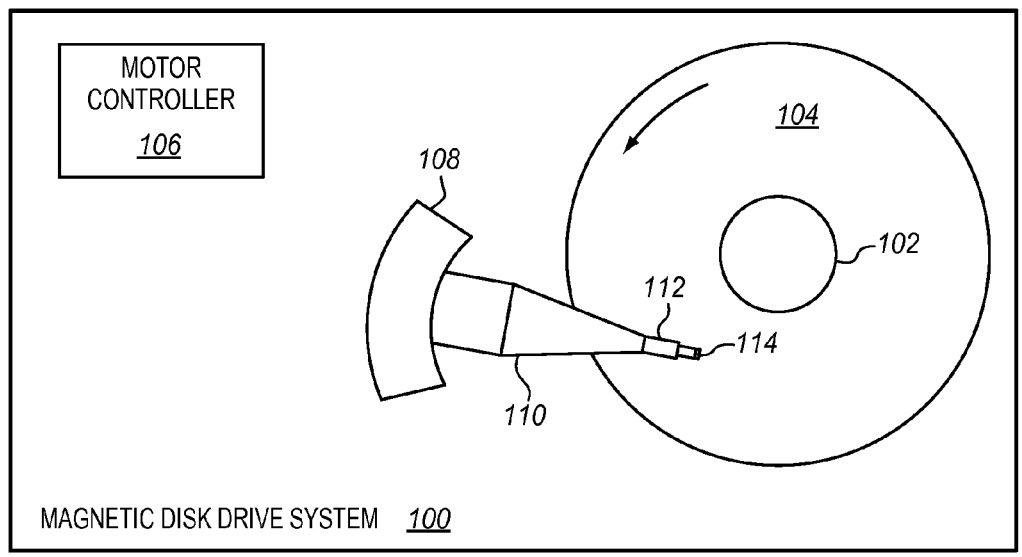
FIG. 1 illustrates a magnetic disk drive system in an exemplary embodiment.

FIG. 1 illustrates a magnetic disk drive system 100 in an exemplary embodiment of the invention. Magnetic disk drive system 100 includes a spindle 102, a perpendicular magnetic recording medium 104, a motor controller 106, an actuator 108, an actuator arm 110, a suspension arm 112, and a recording head 114. Spindle 102 supports and rotates a perpendicular magnetic recording medium 104 in the direction indicated by the arrow. A spindle motor (not shown) rotates spindle 102 according to control signals from motor controller 106. Recording head 114 is supported by suspension arm 112 and actuator arm 110. Actuator arm 110 is connected to actuator 108 that is configured to rotate in order to position recording head 114 over a desired track of perpendicular magnetic recording medium 104. Magnetic disk drive system 100 may include other devices, components, or systems not shown in FIG. 1. For instance, a plurality of magnetic disks, actuators, actuator arms, suspension arms, and recording heads may be used.

When perpendicular magnetic recording medium 104 rotates, an air flow generated by the rotation of magnetic disk 104 causes an air bearing surface (ABS) of recording head 114 to ride on a cushion of air at a particular height above magnetic disk 104. The height depends on the shape of the ABS. As recording head 114 rides on the cushion of air, actuator 108 moves actuator arm 110 to position a read element (not shown) and a write element (not shown) in recording head 114 over selected tracks of perpendicular magnetic recording medium 104.

The perpendicular magnetic recording medium 104 is shown as a disk in FIG. 1. However, a perpendicular magnetic recording medium as discussed can take on other forms in other embodiments.

Figure 2:
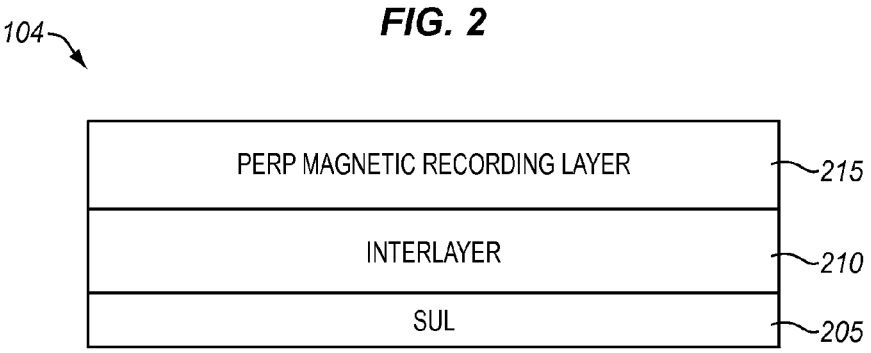
FIG. 2 is a cross-sectional view of one exemplary embodiment of a perpendicular magnetic recording medium.

FIG. 2 is a cross-sectional view illustrating one exemplary embodiment of perpendicular magnetic recording medium 104. Perpendicular magnetic recording medium 104 includes a soft magnetic underlayer (SUL) 205, an interlayer 210, and a perpendicular magnetic recording layer 215. The layers shown in FIG. 2 may be deposited on a substrate (not shown) or on multiple other layers (not shown) previously deposited on a substrate. Perpendicular magnetic recording medium 104 may include other layers not shown in FIG. 2, such as a cap layer, an overcoat layer, etc. For instance, a cap layer may be formed on perpendicular magnetic recording layer 215 from a material such as CoPtCrB. An overcoat layer may be formed on the cap layer to protect perpendicular magnetic recording layer 215 against damage if the recording head happens to contact the perpendicular magnetic recording medium 104.

SUL 205 acts in conjunction with the write head to increase the perpendicular field magnitude and improve the field gradient generated by the write head passing over the perpendicular magnetic recording medium 104. SUL 205 may be formed from CoFeTaZr or another type of material. Interlayer 210 controls the orientation and grain diameter of perpendicular magnetic recording layer 215, and also acts to decouple SUL 205 and perpendicular magnetic recording layer 215. Perpendicular magnetic recording layer 215 comprises one or more materials that have an easy axis of magnetization oriented substantially perpendicular to the substrate. Perpendicular magnetic recording layer 215 is typically formed from a Co-alloy and may contain elements such as Cr and Pt as well as oxides such as $SiO_2$. One example of perpendicular magnetic recording layer 215 comprises CoPtCr—SiOx.

Figure 3:
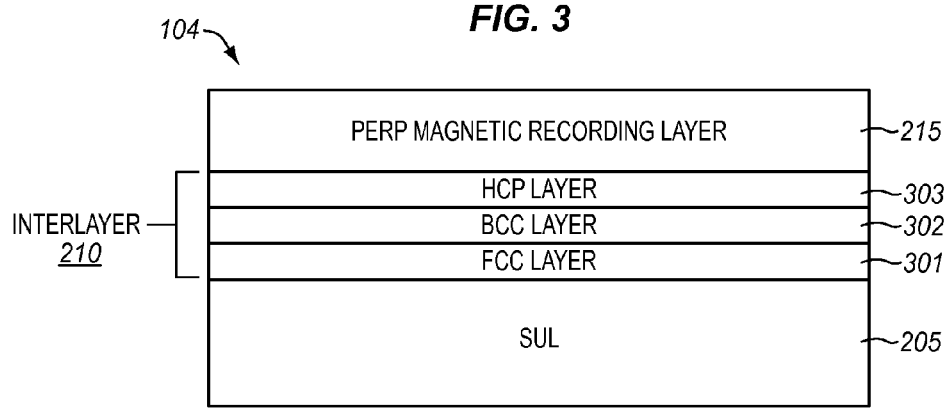
FIG. 3 is a cross-sectional view illustrating one exemplary embodiment of an interlayer.

In this embodiment, interlayer 210 is formed from multiple layers of material having different crystallographic structures. FIG. 3 is a cross-sectional view illustrating one exemplary embodiment of interlayer 210. In FIG. 3, interlayer 210 includes a first layer 301 formed from a material having a FCC structure, such as a FCC(111) structure. The material forming the first layer 301 may be a Ni-based material having the FCC structure, examples of which are NiW, NiCr, NiWCr, NiFeCr, and NiFeW. A Ni-based material means any material solely or partially formed from Ni. The first layer 301 may have a thickness of about 5-10 nanometers.

Interlayer 210 also includes a second layer 302 formed from a material having a BCC structure, such as a BCC(110) structure. The material forming the second layer 302 may be a Cr-based material having the BCC structure, examples of which are Cr, CrMo, CrV, CrTi, CrW, CrMoB, CrMoC, CrMoSe, CrTi, CrV, and MoCr. A Cr-based material means any material solely or partially formed from Cr. The second layer 302 may have a thickness of about 3-15 nanometers.

Interlayer 210 also includes a third layer 303 formed from a material having a HCP structure, such as a HCP(00.2) structure. The material forming the third layer 303 may be a Ru-based material having the HCP structure, examples of which are Ru, RuCr, and RuTi. A Ru-based material means any material solely or partially formed from Ru. The third layer 303 may have a thickness of about 3-15 nanometers. The terms "first", "second", and "third" are used to distinguish between layers of different material, and are not necessarily indicative of a particular order of the layers. Also, interlayer 210 may include more layers than those illustrated in FIG. 3.

Figure 4:
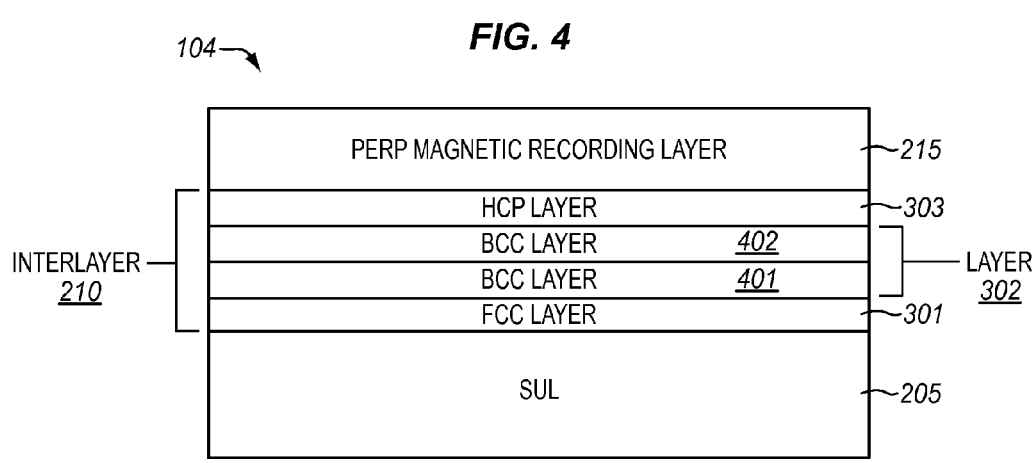
FIG. 4 is a cross-sectional view illustrating another exemplary embodiment of an interlayer.

The second layer 302 of BCC material may be multi-layer itself. FIG. 4 is a cross-sectional view illustrating another exemplary embodiment of interlayer 210. In FIG. 4, the second layer 302 of FIG. 3 is formed from two layers of BCC material. The first layer 401 of BCC material may serve as a crystallographic enhancement layer. As an example, the first layer 401 may comprise a layer of Cr or a Cr alloy (CrX) having a low concentration of a doping element (X), such as Mo, Ti, V, W, Ta, Mn, or another element. The atomic percentage of the doping element (X) in the Cr alloy may be between about 5 to 30%.

The second layer 402 of BCC material may serve as a grain size control layer. As an example, the second layer 402 may comprise a layer of a Cr alloy (CrX or CrXY) having a higher concentration of a doping element. For instance, the Cr alloy (CrX) may have a doping element (X), such as Mo, Ti, V, W, Ta, Mn, or another element. The Cr alloy (CrXY) may additionally have the doping element (Y), such as B, Si, O, N, or another element. The atomic percentage of the doping element (X) in the Cr alloy may be between about 5 to 30%, and the atomic percentage of the doping element (Y) in the Cr alloy may be between about 5 to 10%. The second layer 302 may include more layers of BCC material in other embodiments.

Figure 5:
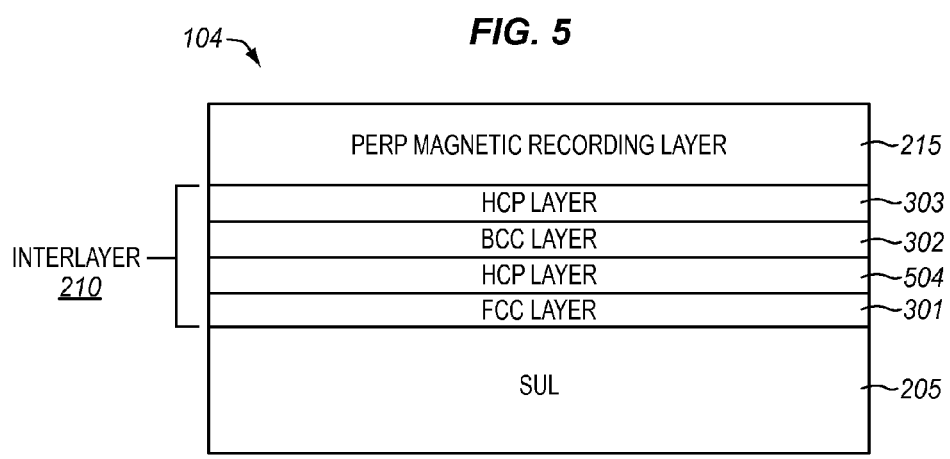
FIG. 5 is a cross-sectional view illustrating another exemplary embodiment of an interlayer.

Interlayer 210 may comprise other layers than those shown in FIGS. 3-4. FIG. 5 is a cross-sectional view illustrating another exemplary embodiment of interlayer 210. In FIG. 5, interlayer 210 includes the first layer 301 formed from a material having a FCC structure. Interlayer 210 also includes the second layer 302 formed from a material having a BCC structure. Interlayer 210 also includes the third layer 303 formed from a material having a HCP structure. These layers resemble the layers illustrated in FIG. 3. However in FIG. 5, interlayer 210 also includes a fourth layer 504 formed from a material having an HCP structure. The fourth layer 504 is formed between the first layer 301 (the FCC layer) and the second layer 302 (the BCC layer). The material forming the fourth layer 504 may be a Ru-based material having the HCP structure, examples of which are Ru, RuCr, and RuTi. Although four layers are shown in FIG. 5, interlayer 210 may comprise more or less than four layers in other embodiments.

For the embodiments shown in FIGS. 3-5, interlayer 210 includes a layer of BCC material that replaces some of the HCP material used in many other interlayers. For instance, assume that a prior interlayer includes 200 Å of HCP material, such as Ru. According to the embodiments herein, some of the 200 Å of HCP material will be replaced with BCC material, such as Cr. For instance, interlayer 210 may include 90 Å of BCC material and 110 Å of HCP material. The thickness of the interlayer 210 does not change, but the amount of HCP material used is almost cut in half. The reduction in HCP material causes a corresponding reduction in cost of fabrication for the perpendicular magnetic recording medium 104 due to the higher cost of the HCP material.

The BCC material works well in interlayer 210 as the lattice of the BCC material matches well with both of the FCC material and the HCP material. With the BCC material replacing some of the HCP material in interlayer 210, interlayer 210 still effectively controls the size of magnetic crystal grains and the orientation of the magnetic crystal grains in perpendicular magnetic recording layer 215. Interlayer 210 also effectively serves to magnetically de-couple SUL 205 and perpendicular magnetic recording layer 215. If a BCC material such as Cr is used in interlayer 210, perpendicular magnetic recording medium 104 will also exhibit a higher resistance to corrosion.

Figure 6:
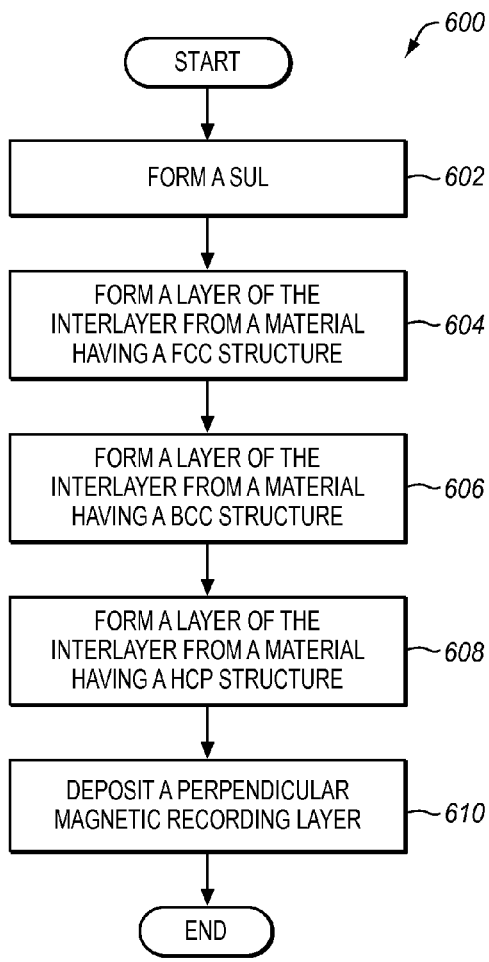
FIG. 6 is a flow chart illustrating one exemplary method of fabricating a perpendicular magnetic recording medium.
Figure 7:
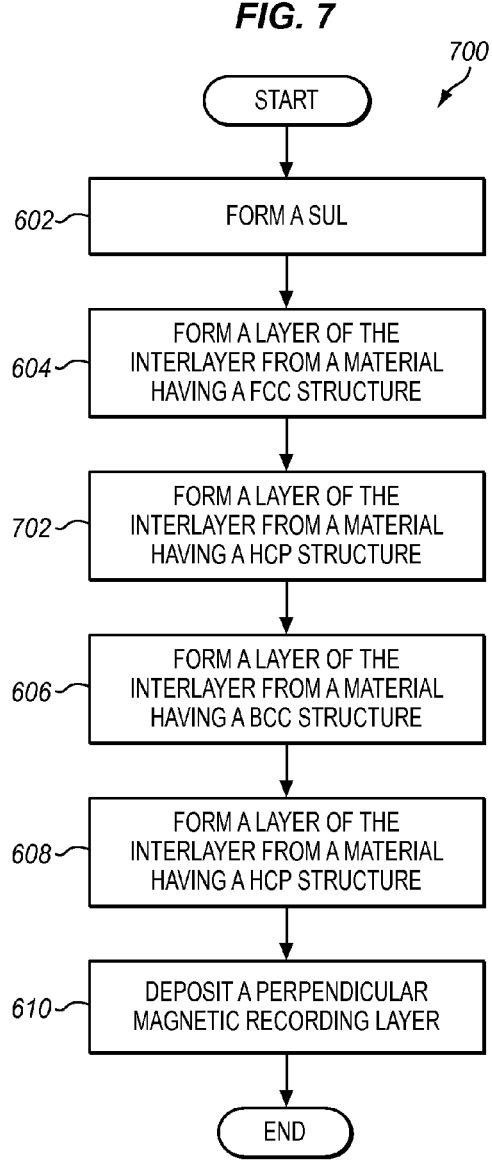
FIG. 7 is a flow chart illustrating another exemplary method of fabricating a perpendicular magnetic recording medium.

FIGS. 6-7 illustrate possible methods of fabricating the perpendicular magnetic recording medium 104. FIG. 6 is a flow chart illustrating one exemplary method 600 of fabricating perpendicular magnetic recording medium 104. In step 602, SUL 205 is formed (see FIG. 3) such as by depositing material for SUL 205 on a nonmagnetic substrate or on other layers previously deposited. In step 604, a first layer 301 of interlayer 210 is formed (see FIG. 3). The first layer 301 is formed from a material having a FCC structure, such as a Ni-based material. In step 606, a second layer 302 of interlayer 210 is formed (see FIG. 3). The second layer 302 is formed from a material having a BCC structure, such as a Cr-based material. In step 608, a third layer 303 of interlayer 210 is formed (see FIG. 3). The third layer 303 is formed from a material having a HCP structure, such as a Ru-based material. In step 610, perpendicular magnetic recording layer 215 is formed (see FIG. 2) such as by depositing material for perpendicular magnetic recording layer 215. The material for perpendicular magnetic recording layer 215 may comprise CoPtCr—SiOx or another material. Method 600 forms the perpendicular magnetic recording medium 104 illustrated in FIG. 3. There may be other layers of material deposited than those described in method 600.

To form the perpendicular magnetic recording medium 104 illustrated in FIG. 4, step 606 of method 600 would include two steps of depositing BCC material. The first step may comprise forming a layer of BCC material that serves as a crystallographic enhancement layer. The second step may comprise forming another layer of BCC material that serves as a grain size control layer. Exemplary compositions of these layers of BCC material are provided above.

FIG. 7 is a flow chart of another exemplary method 700 of fabricating perpendicular magnetic recording medium 104. Method 700 is substantially similar to method 700 in forming SUL 205, a first layer 301 (FCC material) of interlayer 210, a second layer 302 (BCC material) of interlayer 210, a third layer 303 (HCP material) of interlayer 210, and perpendicular magnetic recording layer 215 (see FIG. 5). Method 700 includes the additional step 702 where a fourth layer 504 of interlayer 210 is formed (see FIG. 5). The fourth layer 404 is formed from a material having a HCP structure, such as a Ru-based material. Method 700 forms the perpendicular magnetic recording medium 104 illustrated in FIG. 5. There may be other layers of material deposited than those described in method 700.

Figure 8:
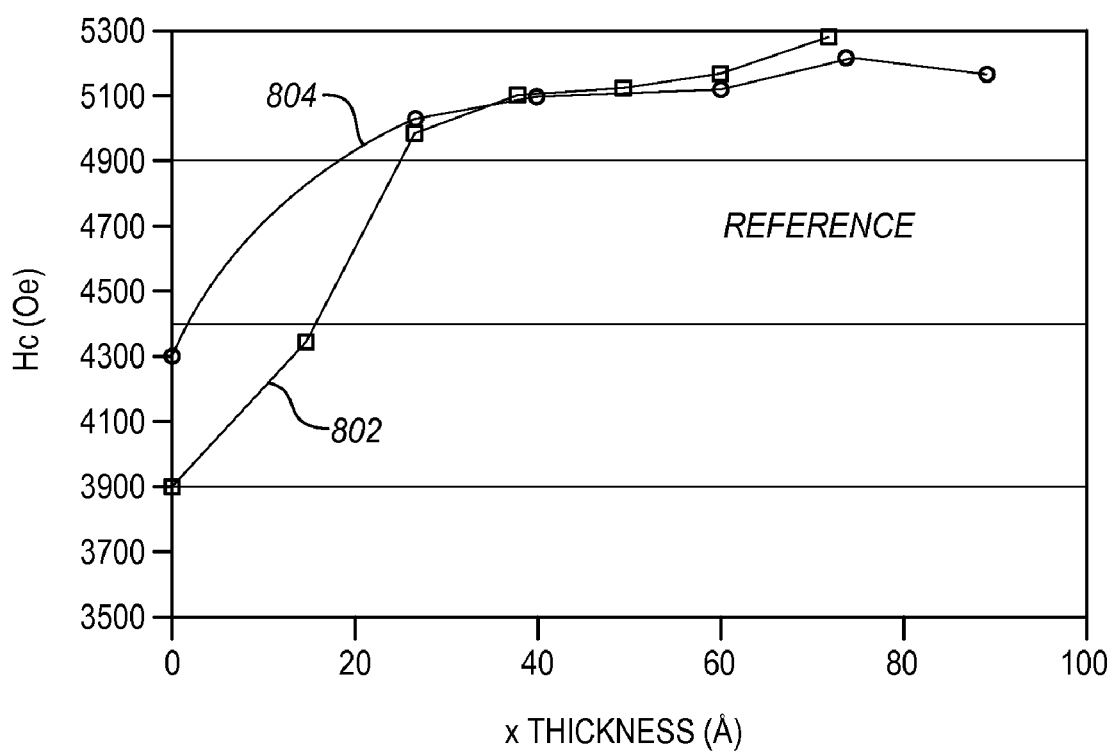
FIG. 8 is a graph illustrating the performance of a perpendicular magnetic recording medium using an interlayer as provided herein.

FIG. 8 is a graph illustrating the performance of a perpendicular magnetic recording medium using the interlayer 210 provided herein. Assume for this example that interlayer 210 includes a first layer 301 of NiW (FCC structure), a second layer 302 of Cr (BCC structure), and a third layer 303 of Ru (HCP structure). Graph 800 in FIG. 8 illustrates the coercivity of the interlayer for different thicknesses of NiW and Cr. A coercivity measurement indicates the quality of the magnetic layer growth in the perpendicular direction. A high coercivity (Hc) represents a good crystalline orientation.

As a reference point, graph 800 illustrates the coercivity of a typical interlayer formed from NiW(70)/Ru(90)/Ru(90) (a FCC/HCP interlayer), where the thicknesses referred to are in Angstroms. The coercivity of this reference point is about 4900 Oe. Graph 800 also illustrates data points 802 for NiW (x)/Cr(90)/Ru(110) (a FCC/BCC/HCP interlayer). As x increases above about 20 Å, the coercivity raises above 4900 Oe. At about 70 Å, the coercivity is about 5300 Oe. This indicates that the FCC/BCC/HCP interlayer provides a good crystalline orientation even better than the FCC/HCP interlayer traditionally used.

Graph 800 also illustrates data points 804 for NiW(52)/Cr (x)/Ru(110). As x increases above about 20 Å, the coercivity raises above 4900 Oe again. At about 70 Å, the coercivity is between 5200 and 5300 Oe. This again indicates that the FCC/BCC/HCP interlayer provides a good crystalline orientation even better than the FCC/HCP interlayer traditionally used.

Although specific embodiments were described herein, the scope of the invention is not limited to those specific embodiments. The scope of the invention is defined by the following claims and any equivalents thereof.

We claim:

1. An interlayer of a perpendicular magnetic recording medium, the interlayer comprising:
   a face-centered-cubic (FCC) layer;
   a first hexagonal-close-packed (HCP) layer formed directly on the FCC layer;
   a body-centered-cubic (BCC) layer formed directly on the first HCP layer; and
   a second HCP layer formed directly on the BCC layer.

2. The interlayer of claim 1 wherein the FCC layer comprises a Ni-based material.

3. The interlayer of claim 2 wherein the Ni-based material comprises NiWCr.

4. The interlayer of claim 1 wherein the BCC layer comprises a Cr-based material.

5. The interlayer of claim 1 wherein the first and second HCP layers comprise a Ru-based material.

6. A method of fabricating an interlayer of a perpendicular magnetic recording medium, the method comprising:
   forming a face-centered-cubic (FCC) layer;
   forming a first hexagonal-close-packed (HCP) layer directly on the FCC layer;
   forming a body-centered-cubic (BCC) layer directly on the first HCP layer; and
   forming a second HCP layer directly on the BCC layer.

7. The method of claim 6 wherein the FCC layer comprises a Ni-based material.

8. The method of claim 7 wherein the Ni-based material comprises NiWCr.

9. The method of claim 6 wherein the BCC layer comprises a Cr-based material.

10. The method of claim 6 wherein the first and second HCP layers comprise a Ru-based material.

11. A perpendicular magnetic recording medium, comprising:
    a soft magnetic underlayer (SUL) formed on a nonmagnetic substrate;
    an interlayer formed on the SUL; and
    a perpendicular magnetic recording layer formed on the interlayer and having an easy axis of magnetization oriented substantially perpendicular to the substrate;
    wherein the interlayer comprises:
       a face-centered-cubic (FCC) layer;
       a first body-centered-cubic (BCC) layer formed directly on the FCC layer;
       a second BCC layer formed directly on the first BCC layer, wherein the second BCC layer has a higher concentration of a doping element than the first BCC layer; and
       a hexagonal-close-packed (HCP) layer formed directly on the second BCC layer.

12. The perpendicular magnetic recording medium of claim 11 wherein the FCC layer is comprised of a Ni-based material.

13. The perpendicular magnetic recording medium of claim 11 wherein the first and second BCC layers are comprised of a Cr-based material.

14. The perpendicular magnetic recording medium of claim 11 wherein the HCP layer is comprised of a Ru-based material.

15. A method of fabricating a perpendicular magnetic recording medium, the method comprising:
    forming a soft magnetic underlayer (SUL) on a nonmagnetic substrate;
    forming a face-centered-cubic (FCC) layer for an interlayer;
    forming a first body-centered-cubic (BCC) layer for the interlayer directly on the FCC layer;
    forming a second BCC layer for the interlayer directly on the first BCC layer, wherein the second BCC layer has a higher concentration of a doping element than the first BCC layer;
    forming a hexagonal-close-packed (HCP) layer for the interlayer directly on the second BCC layer; and
    forming a perpendicular magnetic recording layer on the HCP layer.

16. The method of claim 15 wherein the FCC layer is comprised of a Ni-based material.

17. The method of claim 15 wherein the first and second BCC layers are comprised of a Cr-based material.

18. The method of claim 15 wherein the HCP layer is comprised of a Ru-based material.

* * * * *